US012791478B2

(12) United States Patent
Flühmann et al.

(10) Patent No.: US 12,791,478 B2
(45) Date of Patent: Nov. 10, 2026

(54) SLIM ATR SENSOR WITH A MEASURING AND REFERENCE SIGNAL

(71) Applicant: Hamilton Bonaduz AG, Bonaduz (CH)

(72) Inventors: Christa Flühmann, Sargans (CH); Dirk Schönfuss, Rhäzüns (CH); Dario Blumenthal, Scharans (CH); Moritz Julian Banholzer, Tamins (CH)

(73) Assignee: Hamilton Bonaduz AG, Bonaduz (CH)

( * ) Notice: Subject to any disclaimer, the term of this patent is extended or adjusted under 35 U.S.C. 154(b) by 103 days.

(21) Appl. No.: 18/872,540

(22) PCT Filed: Jun. 5, 2023

(86) PCT No.: PCT/EP2023/064910
§ 371 (c)(1),
(2) Date: Dec. 6, 2024

(87) PCT Pub. No.: WO2023/241959
PCT Pub. Date: Dec. 21, 2023

(65) Prior Publication Data

US 2025/0164395 A1 May 22, 2025

(30) Foreign Application Priority Data

Jun. 14, 2022 (DE) ..................... 10 2022 114 935.8

(51) Int. Cl.
*G01N 21/552* (2014.01)

(52) U.S. Cl.
CPC ..... *G01N 21/552* (2013.01); *G01N 2201/061* (2013.01)

(58) Field of Classification Search
CPC ........... G01N 21/552; G01N 2201/061; G01N 2201/0221; G01N 21/3577; G01N 21/35; G01N 21/3563
See application file for complete search history.

(56) References Cited

U.S. PATENT DOCUMENTS 4,746,179 A 5/1988 Dahne et al.
5,548,393 A 8/1996 Nozawa et al.
(Continued)

FOREIGN PATENT DOCUMENTS

DE 29918295 U1 8/2000
DE 10316514 A1 2/2004
DE 102017001175 A1 8/2018

OTHER PUBLICATIONS

German Search Report for corresponding DE 10 2022 114 935.8 mailed Mar. 9, 2023, 7 pgs.
(Continued)

*Primary Examiner* — Courtney D Thomas
(74) *Attorney, Agent, or Firm* — Rankin, Hill & Clark LLP

(57) ABSTRACT

An ATR sensor having a sensor housing, wherein at least the following sensor components are accommodated in the sensor housing: an infrared radiation source, an ATR element, wherein the ATR element is designed to transmit infrared radiation via reflection on at least one boundary surface of the ATR element; an infrared measuring sensor which detects infrared radiation emitted by the infrared radiation source after its transmission via the ATR element, and which outputs a measuring detection signal depending on the infrared radiation detected by the infrared measuring sensor; and infrared reference sensor which detects infrared radiation emitted by the infrared radiation source that is not transmitted by the ATR element, and which outputs a reference detection signal depending on the infrared radiation detected by the infrared reference sensor, the infrared radiation source being designed and arranged to radiate an infrared measuring radiation portion detected by the infrared measuring sensor in a measuring radiation direction, and to simultaneously radiate an infrared reference radiation por- (Continued)

tion detected by the infrared reference sensor in a reference radiation direction that is different to the measuring radiation direction.

17 Claims, 1 Drawing Sheet

(56) References Cited

U.S. PATENT DOCUMENTS

| | | | | |
|---|---|---|---|---|
| 7,593,107 | B2 | 9/2009 | Wolf et al. | |
| 9,989,460 | B2 | 6/2018 | Schlosser et al. | |
| 2016/0143539 | A1* | 5/2016 | Koerner | A61B 5/0086 600/475 |
| 2016/0223459 | A1* | 8/2016 | Schlosser | G01N 21/4738 |
| 2021/0165123 | A1 | 6/2021 | Fujisawa et al. | |

OTHER PUBLICATIONS

International Search Report for corresponding PCT/EP2023/064910 mailed Aug. 16, 2023, 13 pgs.
Espacenet Bibliographic data: DE 102017001175 (A1), Published Aug. 9, 2018, 1 pg.
Espacenet Bibliographic data: DE 10316514 (A1), Published Feb. 5, 2004, 2 pgs.
International Preliminary Report On Patentability for corresponding PCT/EP2023/064910 mailed Dec. 14, 2024, 7 pgs.

* cited by examiner

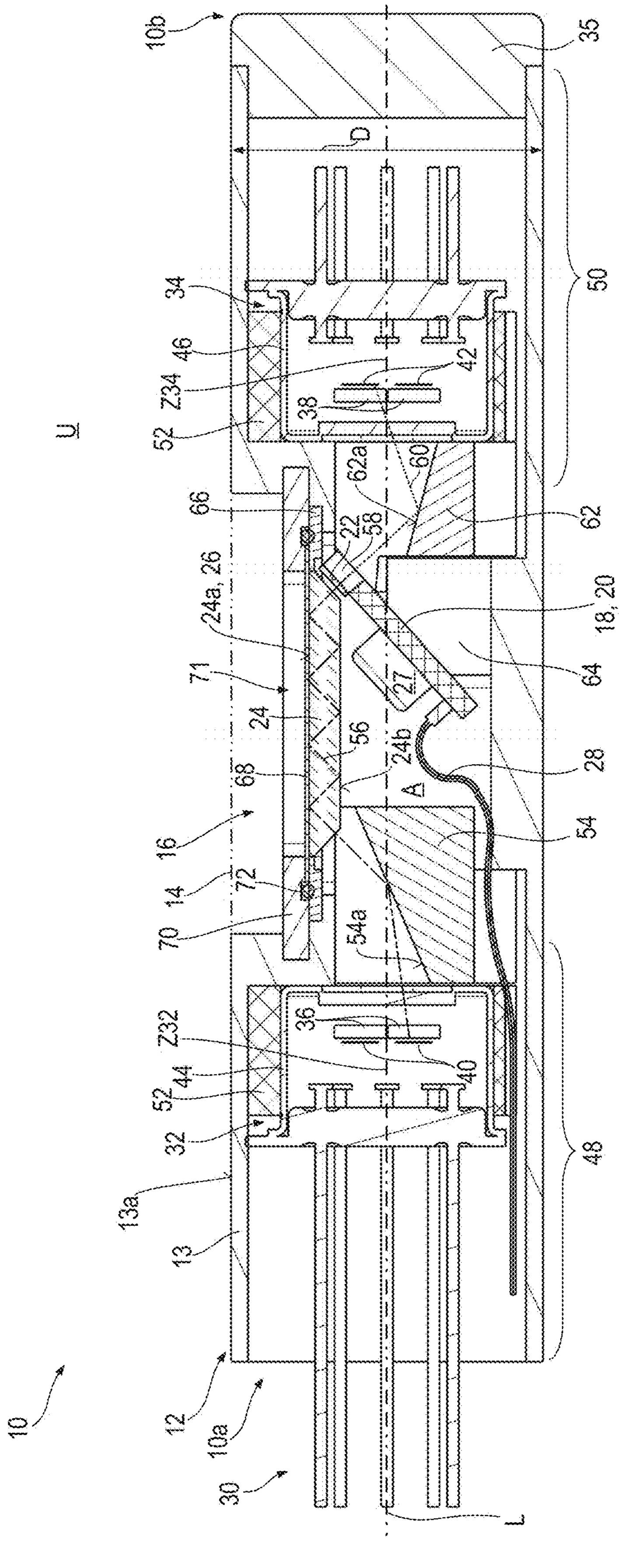
10b
35
D
50
34
46
42
Z34
38
52
U
62a
60
66
22
58
62
24a, 26
18, 20
71
27
64
24
56
24b
28
68
A
16
54
14
72
70
54a
36
Z32
40
44
52
32
48
13a
13
10
12
10a
30
L

SLIM ATR SENSOR WITH A MEASURING AND REFERENCE SIGNAL

This application claims priority in PCT application PCT/EP2023/064910 filed Jun. 5, 2023, which claims priority in German Patent Application DE 10 2022 114 935.8 filed on Jun. 14, 2022, which are incorporated by reference herein.

The present invention concerns an ATR sensor, comprising a sensor housing, where in the sensor housing there are accommodated at least the following sensor components:

An infrared radiation source,

An ATR element, where the ATR element as an ATR measuring element is configured to transmit infrared radiation under reflection to at least one boundary surface of the ATR measuring element, An infrared measuring sensor which is arranged in the sensor housing in such a way that it captures infrared radiation emitted by the infrared radiation source after its transmission through the ATR measuring element, and which is configured to output a measurement capture signal as a function of the infrared radiation captured by the infrared measuring sensor, An infrared reference sensor which is arranged in the sensor housing in such a way that it captures infrared radiation emitted by the infrared radiation source which is not transmitted by the ATR measuring element, and which is configured to output a reference capture signal as a function of the infrared radiation captured by the infrared reference sensor.

BACKGROUND OF THE INVENTION

Such an ATR sensor is known from US 2021/165123 A1. 'ATR' stands for 'Attenuated Total Reflection', i.e. for a measurement principle based on a weakened total reflection. This measurement principle is generally known. The physical principles used by this measurement principle for acquiring knowledge and their metrological utilization are elucidated very well in the publication DE 103 16 514 A1, to whose description reference is made at this point for elucidating the measurement principle.

Further ATR sensors both with an infrared measuring sensor and with an infrared reference sensor are known for example from U.S. Pat. No. 7,593,107 B2 and from EP 3 026 426 A1.

In all the aforementioned state of the art publications which disclose an ATR sensor both with an infrared measuring sensor and with an infrared reference sensor, the infrared radiation fraction supplied to the infrared reference sensor is obtained through beam splitting of infrared radiation emitted by the infrared radiation source.

Indeed, this beam splitting makes possible a very good comparison of the infrared measuring radiation fraction captured by the infrared measuring sensor with the infrared reference radiation fraction captured by the infrared reference sensor. However, the infrared measuring radiation fraction is decreased by the infrared reference radiation fraction branched off from it, which increases the risk of an undesirably elevated signal-to-noise ratio. Moreover, a beam splitter as a physical component requires installation space in an infrared measuring sensor, thus acting against a desired miniaturization and/or compact design of the infrared measuring sensor.

SUMMARY OF THE INVENTION

It is, therefore, the task of the present invention to propose an ATR sensor which with the same radiation power is able to provide a more advantageous signal-to-noise ratio than the state of the art ATR sensors. In a further-leading thought, it is likewise an objective of the present invention to provide an ATR sensor with the smallest possible installation space dimensions.

The present invention solves this named task through an ATR sensor with the features named at the beginning by having the infrared radiation source configured and arranged to radiate an infrared measuring radiation fraction of the infrared radiation emitted by the infrared radiation source captured by the infrared measuring sensor in a measurement radiation direction and at the same time to radiate an infrared reference radiation fraction of the infrared radiation emitted by the infrared radiation source captured by the infrared reference sensor in a reference radiation direction different from the measurement radiation direction.

Through the simultaneous radiation of the infrared reference radiation fraction on the one hand and of the infrared measuring radiation fraction on the other, an outstanding reference quality of the infrared reference radiation fraction is furthermore ensured since through the simultaneous radiation, the infrared measuring radiation fraction and the infrared reference radiation fraction are emitted by the infrared radiation source with the same emission characteristic of the latter. Because of the simultaneous emission, a change in the emission characteristic between radiation of the infrared measuring radiation fraction and radiation of the infrared reference radiation fraction is ruled out.

Through the radiation in different spatial directions, the infrared measuring radiation fraction radiated the in measurement radiation direction can be utilized for the metrological knowledge acquisition at its full signal strength. Likewise, the infrared reference radiation fraction radiated in the reference radiation direction which differs from the measurement radiation direction can be utilized to its full extent for providing a high-quality reference for evaluating the infrared measuring radiation fraction captured by the infrared measuring sensor. For the same emitted power, therefore, a higher useful signal level is obtained both on the side of the infrared measuring sensor and on the side of the infrared reference sensor. Overall, therefore, for the same nominal power the ATR sensor can offer a higher signal-to-noise ratio.

An advantageously slim ATR sensor can be obtained by having the sensor housing extending along a sensor housing longitudinal axis which defines an axial direction, where the infrared measuring sensor and the infrared reference sensor are arranged in the sensor housing at an axial distance from one another. The sensors can be arranged in an especially space-saving manner if they have an essentially matching constructional form. The infrared measuring sensor and the infrared reference sensor preferably exhibit a housing which over at least 80%, more preferably over at least 90%, of its housing length is prismatic, conical, or cylindrical. The housing of the infrared reference sensor on the one hand and of the infrared measuring sensor on the other can exhibit here quite different housing forms. Thus, a sensor made of an infrared reference sensor and infrared measuring sensor can exhibit one housing with a shape made out of a prism, cone, frustum, and cylinder and the respective other sensor can exhibit a different shape out of a prism, cone, frustum, and cylinder. When determining the housing form, what is important here is less the design of the front faces than the design of the lateral surface of the housing encircling the housing axis. The front faces of the housing, therefore, do not have to be planar. The housings, nonetheless, are deemed to be prismatic, conical, or cylindrical if their lateral surface is that of a prism, a cone, a frustum, or a cylinder.

The housings of the infrared reference sensor and of the infrared measuring sensor preferably each extend along a housing axis, which depending on the housing form can preferably be a prism axis, cone axis, or cylinder axis. In order to achieve the slimmest possible ATR sensor, the infrared reference sensor on the one hand and the infrared measuring sensor on the other are preferably each arranged in the sensor housing with coaxial housing axes. To this end, further preferably, the housing axes are for preference oriented in parallel or coaxially to the sensor housing longitudinal axis. Thereby, the dimension of the sensor housing of the ATR sensor orthogonally to its sensor housing longitudinal axis can be kept small.

Any connecting contacts going away from the housing of the infrared reference sensor and of the infrared measuring sensor are not taken into account when calculating the length of the housings of these sensors.

The infrared reference sensor on the one hand and the infrared measuring sensor on the other are preferably arranged in the sensor housing with sensor capturing surfaces facing towards one another.

The infrared radiation source can be advantageously arranged axially, with respect to the sensor housing longitudinal axis, between the infrared measuring sensor and the infrared reference sensor. Thereby, the radiation paths from the infrared radiation source to the infrared measuring sensor and to the infrared reference sensor can be adjusted to be approximately equal in length, which further increases the quality of the reference signal relative to the measurement signal.

In order to achieve the slimmest possible ATR sensor, that is, one projecting as little as possible orthogonally to its sensor housing longitudinal axis, according to an advantageous development of the present invention the ATR measuring element can be arranged axially between the infrared measuring sensor and the infrared reference sensor. Since the infrared radiation source radiates the infrared measuring radiation fraction and the infrared reference radiation fraction in different spatial directions, arranging the ATR measuring element axially between the infrared reference sensor and the infrared measuring sensor is not a problem.

The infrared measuring sensor and/or the infrared reference sensor is preferably a multi-channel sensor, especially preferably a four-channel sensor. Multi-channel sensors, which for each channel normally require a separate capturing surface and a radiation filter assigned to the respective capturing surface, where the capturing surfaces, mostly also the radiation filters, lie in a common plane for the capturing surfaces or for the radiation filters as the case may be, take up due to their construction, comparatively speaking, a great deal of installation space. Through the radiation of infrared radiation by the infrared radiation source in different, preferably opposite, spatial directions, as described above, the infrared measuring sensor and the infrared reference sensor can be arranged in the sensor housing in different places at a distance from one another. Thereby, both the infrared measuring sensor and the infrared reference sensor can each be configured as a multi-channel sensor, in particular as a four-channel sensor, without hereby requiring a sensor housing of an undesirably large size, in particular of an undesirably large diameter. The sensor housing can nonetheless remain slim, preferably with a diameter of no more than 12 mm.

Since normally the ATR element as the ATR measuring element is so arranged at the sensor housing that a lateral surface of the ATR measuring element is accessible to a fluid outside the sensor housing for its metrological capture by an ATR method, the ATR measuring element is preferably situated at a distance from the virtual sensor housing longitudinal axis conceived as penetrating centrally through the sensor housing. In order to be as free as possible in the arrangement of at least one sensor out of infrared measuring sensor and infrared reference sensor in the sensor housing, there is preferably arranged an infrared measuring radiation reflector axially between the ATR measuring element and the infrared measuring sensor and/or there is preferably arranged an infrared reference radiation reflector axially between the infrared radiation source and the infrared reference sensor. In principle, the infrared reference radiation fraction can be guided by a radiation guide, for instance an ATR element, from the infrared radiation source to the infrared reference sensor. A radiation guide used for this purpose, however, is not the ATR measuring element of the ATR sensor.

The ATR measuring element can in principle exhibit an arbitrary shape, as long as it exhibits boundary surfaces arranged at a distance from one another which can totally reflect infrared radiation and the infrared radiation can thus propagate in the ATR measuring element. The ATR measuring element is preferably configured prismatically, at least section-wise. The configuration of a single boundary surface as a totally-reflecting measurement surface facing towards the external environment of the ATR sensor suffices in principle. Preferably, opposite to each other, especially preferably parallel exterior surfaces of the ATR measuring element form the boundary surfaces which totally reflect the infrared radiation coupled into the ATR measuring element. As a result, infrared radiation coupled into the ATR measuring element can be reflected multiply between the boundary surfaces, thus transmitted through the ATR measuring element over a greater path. The coupling of the infrared radiation preferably takes place over a lateral surface running between the totally reflecting boundary surfaces.

This can, to facilitate the coupling of the infrared radiation, be tilted with respect to the totally reflecting opposite, preferably parallel, boundary surfaces at a different angle than a right angle. For secure decoupling of the infrared radiation from the ATR measuring element, the ATR measuring element is preferably configured mirror-symmetrically, which additionally helps to prevent assembly errors. The decoupling surface of the ATR measuring element, configured mirror-symmetrically to the coupling surface, makes it possible for an infrared part-beam to emerge from the ATR measuring element between the parallel boundary surfaces through the decoupling surface after multiple total reflection-ignoring the attenuation of the infrared radiation at the boundary surface serving as measurement surface, which is a surface of the ATR measuring element directed towards the external environment of the ATR sensor—at the same or a similar angle as the angle at which it was coupled into the ATR measuring element through the coupling surface.

To achieve a desired slim ATR sensor, preferably the spatially smallest possible infrared radiation source is used, for example a thread—or rod-like infrared filament source. For a precise and secure arrangement of the infrared radiation source regardless of its respective shape, the infrared radiation source is preferably arranged on a carrier component.

In order to make it possible reliably for the infrared radiation source to be able to radiate the infrared measuring radiation fraction and the infrared reference radiation fraction not only in slightly different spatial directions but in considerably different spatial directions, the carrier component can exhibit a slot which penetrates through the carrier component in the direction away from the infrared radiation source. The infrared radiation source can then be arranged at the carrier component for the emission of infrared radiation through the slot. In particular, the infrared radiation source can be configured and arranged to emit only one infrared radiation fraction out of infrared reference radiation fraction and infrared measuring radiation fraction through the slot in the carrier component, and to emit the respective other infrared radiation fraction in a direction away from the carrier component but not through the latter. The infrared radiation source is preferably situated in the slot or in the penetration direction in which the slot penetrates the carrier component, above or below the slot.

Since the infrared radiation source, for the best possible coupling of the infrared measuring radiation fraction emitted by it into the ATR measuring element, normally is arranged near to a boundary surface of the ATR measuring element, the infrared radiation source preferably emits the infrared reference radiation fraction through the slot in the carrier component.

The slot can be a hole in the carrier component completely surrounded by material of the carrier component or can be a recess extending from an edge of the carrier component into the latter.

Normally the infrared radiation source radiates an infrared radiation fraction as a radiation cone away from the infrared radiation source. Let the radiation direction of the respective infrared radiation fraction then be the cone axis or another radiation axis which penetrates centrally through the infrared radiation fraction in its spatial region. A spatial angle between the radiation directions of the infrared measuring radiation fraction and of the infrared reference radiation fraction is then the smallest angle between the radiation axes of the aforementioned radiation fractions. The spatial angle between the radiation directions of the infrared measuring radiation fraction and of the infrared reference radiation fraction preferably equals 90° to 180°. The infrared reference radiation fraction preferably exhibits a propagation component which is opposite to a propagation component of the infrared measuring radiation fraction. Especially preferably, the infrared radiation source emits the infrared measuring radiation fraction and the infrared reference radiation fraction in opposite directions, that is, with radiation axes which enclose an angle of 180°.

In principle, the carrier component can be any arbitrary component at or in which the infrared radiation source is directly mounted. Preferably, the carrier component is a printed circuit board. Then the infrared radiation source can be an SMD radiation source which can be soldered, welded, or bonded onto a surface of the carrier component.

For the most effective utilization possible of the installation space in the sensor housing, there is preferably arranged on the printed circuit board at least one further electronic component. This further electronic component can be a control device which controls the operation of the infrared radiation source. Likewise there can be arranged on the printed circuit board a temperature-measuring element, preferably an NTC measuring element, for instance in order to capture a temperature of the infrared radiation source or near the same.

The carrier component as printed circuit board is preferably connected or at least connectible electrically through a conductor arrangement with the external environment of the sensor housing, such that via this conductor arrangement electric energy can be fed to the printed circuit board in order to supply the infrared radiation source and where applicable the at least one further electronic component, in particular the control device, with electric energy. Via the conductor arrangement there can be additionally or alternatively signals transmitted to the control device which the latter processes for controlling the operation of the infrared radiation source. The control device can comprise an integrated circuit.

In principle, the carrier component can be arranged in the sensor housing in an arbitrary manner. An arrangement with an advantageously low installation space requirement can obtained by having the carrier component retained or at least supported at a reflector arrangement, of which the infrared measuring radiation reflector or the infrared reference radiation reflector forms at least a component. The carrier component can be retained directly by the infrared measuring radiation reflector or the infrared reference radiation reflector or it can be retained by a structural component, which additionally to the carrier component and preferably at a distance from the latter retains a reflector out of the infrared measuring radiation reflector and infrared reference radiation reflector.

Normally the ATR sensor is deployed for metrological examination of a fluid. The fluid can contain suspended substances which could interfere with the measurement results of the ATR sensor if they get into the capture region of the ATR measuring element. Such suspended substances can for example be cell membranes or cell membrane segments. In order to prevent undesirable suspended substances interfering with the measurement results of the ATR sensor, according to a preferred development of the present invention there is arranged at the sensor housing a membrane which covers at least section-wise, preferably completely, an outside of the ATR measuring element facing away from the interior of the housing. The membrane is permeable to the respective fluid which is to be captured metrologically but not to the solids contained in the fluid, such as the aforementioned suspended substances. The membrane preferably abuts without a gap against an exterior surface forming a measurement surface of the ATR measuring element. If the membrane is arranged at a distance from the exterior surface acting as measurement surface, this distance is preferably greater than the dimension in the distance direction of an evanescent field forming at the exterior surface during the measurement operation.

The ATR sensor is for preference a slim sensor extending along the sensor housing longitudinal axis, with preferably a dimension along the sensor housing longitudinal axis greater by at least a factor of 3 to 4 than orthogonally to the sensor housing longitudinal axis. In order to achieve this, the sensor housing can exhibit at least one section extending along the sensor housing longitudinal axis with a polyhedral or curved around the sensor housing longitudinal axis exterior surface.

In the case of a polyhedral exterior surface of the section, it is preferably a regular polyhedral exterior surface whose directly adjacent planar exterior surface segments meet along an edge which lies in a common plane with the sensor housing longitudinal axis. Preferably the polyhedral exterior surface displays in the segment in sections orthogonally to the sensor housing longitudinal axis a regular polygon as outer edge, especially preferably with equally long sides. The polyhedral exterior surface can taper in the section along the sensor housing longitudinal axis, for instance in the manner of a truncated pyramid, although this is not preferable. Preferably the planar exterior surface segments of the polyhedral exterior surface run in parallel to the sensor housing longitudinal axis.

The exterior surface curved around the sensor housing longitudinal axis preferably exhibits in the section the sensor housing longitudinal axis as axis of curvature or exhibits at least one axis of curvature parallel to the sensor housing longitudinal axis. The exterior surface thus curved around the sensor housing longitudinal axis too, can taper in the section in the axial direction, for instance as frustum, but preferably extends along the sensor housing longitudinal axis with a constant outer edge in terms of size and shape. The outer edge can have an elliptical or oval shape in sections orthogonal to the sensor housing longitudinal axis, but preferably is circular.

In a development of the shape of the exterior surface of the sensor housing, the sensor housing can exhibit at least one measurement section extending along the sensor housing longitudinal axis with a polyhedral or curved around the sensor housing longitudinal axis exterior surface, in which the infrared measuring sensor is accommodated. Additionally or alternatively, the sensor housing can exhibit at least one reference section extending along the sensor housing longitudinal axis with a polyhedral or curved around the sensor housing longitudinal axis exterior surface, in which the infrared reference sensor is accommodated. The measurement section and the reference section can be configured at an axial distance from one another at the sensor housing. Then the measurement section contains the infrared measuring sensor but not the infrared reference sensor, and the reference section contains the infrared reference sensor but not the infrared measuring sensor.

A sensor housing which is especially simple to handle can be obtained by having the sensor housing exhibit at least section-wise a prismatic and/or cylindrical exterior surface and/or exhibit a prismatic or cylindrical envelope. For the prismatic and/or cylindrical exterior surface, we refer to the above discussion on the sections with a polyhedral or curved exterior surface. In the preferred embodiment with ATR measuring element arranged axially between the infrared measuring sensor and the infrared reference sensor, the sensor housing exhibits an axial section in which a preferably planar exterior surface of the ATR measuring element as its measurement surface is accessible to a metrologically to be captured fluid in the external environment of the sensor housing. At the point of accessibility of the exterior surface of the ATR measuring element, because of the accessible exterior surface of the ATR measuring element the sensor housing is preferably only part-prismatically or part-cylindrically configured, but preferably such that the entire sensor housing over the aforementioned two sections and the axially intermediate region of the accommodation of the ATR measuring element exhibits a prismatic or cylindrical envelope.

Especially preferably, over at least 75% of the extension length of an axial section of the sensor housing which contains the infrared radiation source, the ATR measuring element, the infrared measuring sensor, and the infrared reference sensor, especially preferably over at least 85% of the aforementioned extension length, more preferably over at least 95% of the aforementioned extension length, most preferably over the entire extension length, the ATR sensor does not exceed a dimension of 12 mm orthogonally to the sensor housing longitudinal axis. This makes possible the use of the ATR sensor in sensor receptacles available in the marketplace.

These and other objects, aspects, features and advantages of the invention will become apparent to those skilled in the art upon a reading of the Detailed Description of the invention set forth below taken together with the drawings which will be described in the next section.

BRIEF DESCRIPTION OF THE DRAWINGS

The invention may take physical form in certain parts and arrangement of parts, a preferred embodiment of which will be described in detail and illustrated in the accompanying drawings which forms a part hereof and wherein:

FIG. 1A schematic longitudinal section view through an embodiment according to the invention of an ATR sensor of the present application.

DESCRIPTION OF PREFERRED EMBODIMENTS

Referring now to the drawings wherein the showings are for the purpose of illustrating preferred and alternative embodiments of the invention only and not for the purpose of limiting the same, in FIG. 1, an embodiment of an ATR sensor according to the invention is labelled generally by 10. The ATR sensor 10 comprises a sensor housing 12 with a tube 13, which preferably is configured integrally. The sensor housing 12, in particular its tube 13, can in principle be made from a synthetic, but preferably is made from stainless steel in order to also withstand durably aggressive chemical environments.

The sensor housing 12 is configured in the depicted example as a cylindrical housing with a cylindrical envelope 14. The cylindrical envelope 14 is indicated in the region of a recess 16 of the otherwise cylindrical sensor housing 12 by a dotted and dashed line. The sensor housing 12 extends along a sensor housing longitudinal axis L, which as a sensor housing longitudinal axis L conceived as penetrating centrally through the sensor housing 12 is also cylinder axis of the cylindrical sensor housing 12. Outside the recess 16, the cylindrical envelope 14 coincides with the exterior surface 13*a* of the cylindrical tube 13.

In the sensor housing 12 there is arranged a printed circuit board 18 as carrier component 20 of an infrared radiation source 22. For accommodating the printed circuit board 18 there is used an installation space present in the axial extension region of an ATR element 24 as the ATR measuring element 24. This installation space is available since the ATR measuring element 24 with its planar exterior surface 24*a* serving as measurement surface 26 has to be accessible to a metrologically to be captured fluid in the external environment U of the sensor housing 12. Therefore the ATR measuring element 24 is arranged in the sensor housing 12 at a distance from the sensor housing longitudinal axis L.

The infrared radiation source 22 is soldered or welded as a surface-mounted device (SMD) onto the printed circuit board 18. The printed circuit board 18 is a printed circuit board 18 printed with conducting tracks in a manner which is known per se. It carries besides a control device 27 which controls the operation of the infrared radiation source 22. The printed circuit board 18 and thereby the electronic components soldered, welded, or otherwise bonded onto it: infrared radiation source 22 and control device 27, are connectable through a ribbon cable 28 with a power source and/or with a superordinate control device of a laboratory equipment, within which the ATR sensor 10 is deployed.

The ATR sensor 10 exhibits a connecting end 10*a* and an axially with respect to the sensor housing longitudinal axis L opposite top end 10*b*. At the connecting end 10*a*, the ribbon cable 28 plus a connecting arrangement 30 are electrically contactable. The connecting arrangement 30 serves for the output of measurement signals of an infrared measuring sensor 32 and an infrared reference sensor 34. At the top end 10*b* the tube 13 is closed off by a plug 35.

The infrared measuring sensor 32 and the infrared reference sensor 34 can be essentially identically constructed sensor devices which can differ at most in the infrared bandpass filters 36 and/or 38 arranged therein, but do not have to differ. For the sake of simplicity, the output of reference capture signals through the infrared reference sensor 34 and/or their conducting out of the sensor housing 12 is not depicted in FIG. 1, but does take place.

Both the infrared measuring sensors 32 and the infrared reference sensor 34 each exhibit in the depicted example four detectors 40 or 42 respectively, before each of which an infrared bandpass filter 36 or 38 respectively is arranged in the beam path arriving from the infrared radiation source 22.

The infrared measuring sensor 32 exhibits in total four detectors 40, of which in FIG. 1 only the two detectors 40 lying behind the longitudinal section plane containing the sensor housing longitudinal axis L are visible. The other two detectors 40 are situated orthogonally to the drawing plane of FIG. 1 in front of these and in front of the two depicted detectors 40. The same applies to the infrared bandpass filters 36, which are arranged in front of the incidence side of the detectors 40, in order to allow only infrared radiation with a wavelength defined by the respective infrared bandpass filter 36 to be incident on a detector 40.

The infrared bandpass filters 36 have preferably each different wavelengths or wavelength ranges as the case may be, in which solely they are permeable to infrared radiation. Without restriction to the stated example, the individual infrared bandpass filters 36 can let through the following stated bandwidth of infrared radiation through a respective central wavelength and its tolerances: 9.852 μm±0.024 μm, 9.569 μm±0.023 μm, 9.756 μm±0.024 μm and 8.032 μm±0.016 μm. The infrared measuring sensor 32 is thus a four-channel measuring sensor. The infrared reference sensor 34 can be identically constructed, such that for the example depicted here the description given for the infrared measuring sensor 32 is also to be used for explaining infrared reference sensor 34.

The infrared measuring sensor 32 exhibits a housing 44 which over at least 75% of its extension along the sensor housing longitudinal axis L is configured cylindrically with a cylinder axis Z32 which lies coaxially with the sensor housing, longitudinal axis L. The housing 44 of the infrared measuring sensor 32 exhibits therefore also over at least 75% of its axial extension along the cylinder axis Z32 a cylindrical shape. The above discussion of the housing 44 applies respectively mutatis mutandis to the housing 46 of the infrared reference sensor 34 and its cylinder axis Z34.

The sensor housing 12 exhibits an axial measurement section 48 which as a cylindrical measurement section 48 is bounded by an axial section of the cylindrical exterior surface 13*a* of the tube 13 of the sensor housing 12. The infrared measuring sensor 32 is accommodated in the measurement section 48.

At an axial distance from the measurement section 48 the sensor housing 12 exhibits an axial reference section 50. This too, is a cylindrical reference section 50 and is bounded by an axial section of the cylindrical exterior surface 13*a* of the tube 13 of the sensor housing 12. The infrared reference sensor 34 is accommodated in the reference section 50.

In the respective sections: measurement section 48 and reference section 50 there are accommodated the respective infrared sensors: infrared measuring sensor 32 and infrared reference sensor 34, by means of an essentially identically configured positioning element 52. The positioning element 52 is an annular element, which preferably exhibits a groove configured at its radially outer exterior surface for the passage of the ribbon cable 28. At the positioning element 52 of the reference section 50, the groove is empty in the depiction. The ribbon cable 28 is led through the groove of the positioning element 52 of the measurement section 48. Through the groove of the positioning element 52 of the reference section 50, and in its further course also through the groove of the positioning element 52 of the measurement section 48, there can however a conductor not depicted in FIG. 1 proceed for conducting measurement signals of the infrared reference sensor 34 out of the sensor housing 12.

The annular positioning elements 52 can be arranged in the tube 13 in a frictionally engaged manner and can hold each infrared sensor 32 and/or 34 respectively held by them in a frictionally engaged manner. The positioning elements 52 can however also be arranged adhesively at the tube 13 in a fixed manner through the interpositioning of an adhesive agent and can analogously be bonded adhesively with the respective infrared sensor 32 and/or 34 as the case may be positioned by them.

The carrier component 20 with the infrared radiation source 22 and the ATR measuring element 24 are arranged axially between the infrared sensors 32 and 34 with detector surfaces arranged facing towards one another of detectors 40 and 42. Additionally, there is arranged axially between the infrared radiation source 22 and the ATR measuring element 24 an infrared measuring radiation reflector 54, which by means of its reflecting surface 54*a* deflects an infrared measuring radiation fraction 56 emitted by the infrared radiation source 22 and transmitted by the ATR measuring element 24 under reflection at its parallel boundary surfaces 24*a* and 24*b* towards the bandpass filters 36 and the detectors 40 of the infrared measuring sensor 32.

The printed circuit board 18 exhibits a slot 58 at the location of the attachment of the infrared radiation source 22. The infrared radiation source 22 is arranged over the slot 58, such that it can not only radiate infrared radiation as infrared measuring radiation fraction 56 in the direction towards the slanted surface of the ATR measuring element 24, but rather can in the depicted example emit at the same time an infrared reference radiation fraction 60 in the opposite direction through the slot 58 in the printed circuit board 18.

The infrared reference radiation fraction 60 reaches the infrared reference sensor 34 via an infrared reference radiation reflector 62 whose reflecting surface 62*a* deflects the infrared reference radiation fraction 60 emitted by the infrared radiation source 22 towards the bandpass filters 38 and the detectors 42.

The infrared reference radiation reflector 62 is arranged axially between the carrier component 20 with the infrared radiation source 22 arranged on it and the ATR measuring element 24 on the one hand and the infrared reference sensor 34 on the other.

The infrared reference radiation reflector 62 braces the carrier component 20. The carrier component is mounted by means of a mounting component 64 which is situated behind the sectional plane of FIG. 1. A further mounting component 64 can be situated in front of the sectional plane of FIG. 1 in parallel to the depicted mounting component 64.

The ATR measuring element 24 which is permeable to infrared irradiation is bonded with the tube 13 through soldering through a solder section 66 surrounding it.

The measurement surface 26 is covered by a membrane 68, which is directly in contact with the measurement surface 26 and which is permeable to metrologically to be captured fluid in the external environment U of the ATR sensor 10, to suspended substances contained in the fluid such as cells, cell residues, and the like, in contrast not. Distortion of the measurement result through disruptive effects of solid particles is thereby prevented. The membrane 68 is fixed to the measurement surface 26 through a frame 70 anchored with positive locking in the tube 13 or in the sensor housing 12 as the case may be. A seal 72 between the frame 70 and the solder section 66 prevents ingress of fluid from the external environment U into the interior A of the ATR sensor 10 or into its sensor housing 12 as the case may be. The membrane 68 is accessible to fluid in the external environment U via a recess 71 which completely penetrates through the frame 70 in its thickness direction.

The construction described above with components arranged consecutively in the axial direction, where in the axial extension region of the ATR measuring element 24 the ATR measuring element 24, the infrared radiation source 22, and a majority of the carrier component 20 overlap axially, allows very slim dimensioning of the ATR sensor 20 which in its cylindrical and thereby with respect to the sensor housing longitudinal axis L rotation-symmetrical sections 48 and 50 exhibits a dimension D orthogonally to the sensor housing longitudinal axis L which does not exceed 12 mm.

In the region between the measurement section 48 and the reference section 50, namely in the region of the recess 16, the sensor housing 12 is configured part-cylindrically and exhibits a radial dimension starting from the sensor housing longitudinal axis L which at least in the part-cylindrical region of the tube 13 of the sensor housing 12 does not exceed a dimension of 6 mm.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. An ATR sensor, comprising a sensor housing, where in the sensor housing there are accommodated at least the following sensor components:

An infrared radiation source,

An ATR element, where the ATR element as an ATR measuring element is configured to transmit infrared radiation under reflection to at least one boundary surface of the ATR measuring element, An infrared measuring sensor which is arranged in the sensor housing in such a way that it captures infrared radiation emitted by the infrared radiation source after its transmission through the ATR measuring element, and which is configured to output a measurement capture signal as a function of the infrared radiation captured by the infrared measuring sensor, An infrared reference sensor which is arranged in the sensor housing in such a way that it captures infrared radiation emitted by the infrared radiation source which is not transmitted by the ATR measuring element, and which is configured to output a reference capture signal as a function of the infrared radiation captured by the infrared reference sensor, wherein the infrared radiation source is configured and arranged to radiate an infrared measuring radiation fraction of the infrared radiation emitted by the infrared radiation source captured by the infrared measuring sensor in a measurement radiation direction and at the same time to radiate an infrared reference radiation fraction infrared radiation emitted by the infrared radiation source captured by the infrared reference sensor in a reference radiation direction different from the measurement radiation direction, wherein the sensor housing extends along a sensor housing longitudinal axis which defines an axial direction, where the infrared measuring sensor and the infrared reference sensor are arranged in the sensor housing at an axial distance from one another, wherein the infrared radiation source is arranged axially between the infrared measuring sensor and the infrared reference sensor.

2. The ATR sensor according to claim 1, wherein the ATR measuring element is arranged axially between the infrared measuring sensor and the infrared reference sensor.

3. The ATR sensor according to claim 2, wherein axially between the ATR measuring element and the infrared measuring sensor there is arranged an infrared measuring radiation reflector and/or that axially between the infrared radiation source and the infrared reference sensor there is arranged an infrared reference radiation reflector.

4. The ATR sensor according to claim 1, wherein axially between the ATR measuring element and the infrared measuring sensor there is arranged an infrared measuring radiation reflector and/or that axially between the infrared radiation source and the infrared reference sensor there is arranged an infrared reference radiation reflector.

5. The ATR sensor according to claim 1, wherein the infrared radiation source is arranged on a carrier component.

6. The ATR sensor according to claim 5, wherein the carrier component exhibits a slot which penetrates through the carrier component in the direction away from the infrared radiation source, where the infrared radiation source is arranged at the carrier component for the emission of infrared radiation through the slot.

7. The ATR sensor according to claim 5, wherein the carrier component is a printed circuit board.

8. The ATR sensor according to claim 7, wherein on the printed circuit board there is arranged at least one further electronic component.

9. The ATR sensor according to claim 8, wherein axially between the ATR measuring element and the infrared measuring sensor there is arranged an infrared measuring radiation reflector and/or that axially between the infrared radiation source and the infrared reference sensor there is arranged an infrared reference radiation reflector, and wherein the carrier component is retained or supported at a reflector arrangement of which the infrared measuring radiation reflector or the infrared reference radiation reflector forms at least one component.

10. The ATR sensor according to claim 5, wherein axially between the ATR measuring element and the infrared measuring sensor there is arranged an infrared measuring radiation reflector and/or that axially between the infrared radiation source and the infrared reference sensor there is arranged an infrared reference radiation reflector, and wherein the carrier component is retained or supported at a reflector arrangement of which the infrared measuring radiation reflector or the infrared reference radiation reflector forms at least one component.

11. The ATR sensor according to claim 9, wherein the sensor housing extends along a sensor housing longitudinal axis which defines an axial direction, where the infrared measuring sensor and the infrared reference sensor are arranged in the sensor housing at an axial distance from one another, and wherein at the sensor housing there is arranged a membrane which covers at least section-wise an outside of the ATR measuring element facing away from the interior of the housing.

12. The ATR sensor according to claim 1, wherein at the sensor housing there is arranged a membrane which covers at least section-wise an outside of the ATR measuring element facing away from the interior of the housing.

13. The ATR sensor according to claim 1, wherein the sensor housing exhibits at least one section extending along the sensor housing longitudinal axis with a polyhedral or curved around the sensor housing longitudinal axis exterior surface.

14. The ATR sensor according to claim 13, wherein the sensor housing exhibits at least one measurement section extending along the sensor housing longitudinal axis with a polyhedral or curved around the sensor housing longitudinal axis exterior surface in which the infrared measuring sensor is accommodated, and/or that the sensor housing exhibits at least one reference section extending along the sensor housing longitudinal axis with a polyhedral or curved around the sensor housing longitudinal axis exterior surface in which the infrared reference sensor is accommodated.

15. The ATR sensor according to claim 14, wherein the sensor housing exhibits at least section-wise a prismatic and/or cylindrical exterior surface and/or exhibits a prismatic or cylindrical envelope.

16. The ATR sensor according to claim 13, wherein the sensor housing exhibits at least section-wise a prismatic and/or cylindrical exterior surface and/or exhibits a prismatic or cylindrical envelope.

17. The ATR sensor according to claim 1, wherein over at least 75% of the extension length of an axial section of the sensor housing which contains the infrared radiation source, the ATR measuring element, the infrared measuring sensor, and the infrared reference sensor, the ATR sensor does not exceed a dimension of 12 mm orthogonally to the sensor housing longitudinal axis.

* * * * *